United States Patent [19]

Hautau

[11] 4,185,943
[45] Jan. 29, 1980

[54] DRILLING AND TAPPING MACHINING APPARATUS

[75] Inventor: Charles F. Hautau, Oxford, Ohio

[73] Assignee: Ameco Corporation, Menomonee Falls, Wis.

[21] Appl. No.: 899,687

[22] Filed: Apr. 24, 1978

[51] Int. Cl.² .................................................. B23B 39/16
[52] U.S. Cl. ............................................. 408/46; 408/12
[58] Field of Search .................. 408/46, 44, 52, 53, 408/48, 234

[56] References Cited

U.S. PATENT DOCUMENTS

| | | | |
|---|---|---|---|
| 1,835,539 | 12/1931 | Thomas | 408/46 |
| 1,977,202 | 10/1934 | Palkowski et al. | 408/46 X |
| 3,127,661 | 4/1964 | McConnell | 408/46 X |
| 3,529,496 | 5/1970 | Haley | 408/46 X |

Primary Examiner—Gil Weidenfeld
Attorney, Agent, or Firm—Wheeler, Morsell, House & Fuller

[57] ABSTRACT

Disclosed herein is a machine tool which is particularly adapted for drilling and tapping holes in electric motor pole pieces with a center drill, drill and tap which are sequentially applied to the same hole. The spindle for each tool is provided with its own feed motor and drive motor, and each spindle moves vertically independently of the other for the successive machining operations. The drill and tap spindle frames are connected to horizontal lead screws so they can be moved laterally with respect to the center drill for variable hole spacing. Proportionate spacing is provided so that the drill is always intermediate and equally spaced from the center drill and tap to easily accommodate different size pole pieces which have different spacing requirements of the mounting holes. Feed control of each of the spindles is provided by a work surface probe which has a rod slideably supported on each spindle frame so that engagement of the probe with the surface of the pole piece will cause the probe rod to shift through mounting slides and actuate limit switches which change the feed from rapid feed to machining feed. Limit switches are also actuated to stop feed when the selected machining depth has occurred and initiate reverse feed to withdraw the tool from the work material. The arrangement for feeding and driving the spindles affords compact positioning of the spindles so that the center distance of each of the tools can be as close as three inches.

3 Claims, 10 Drawing Figures

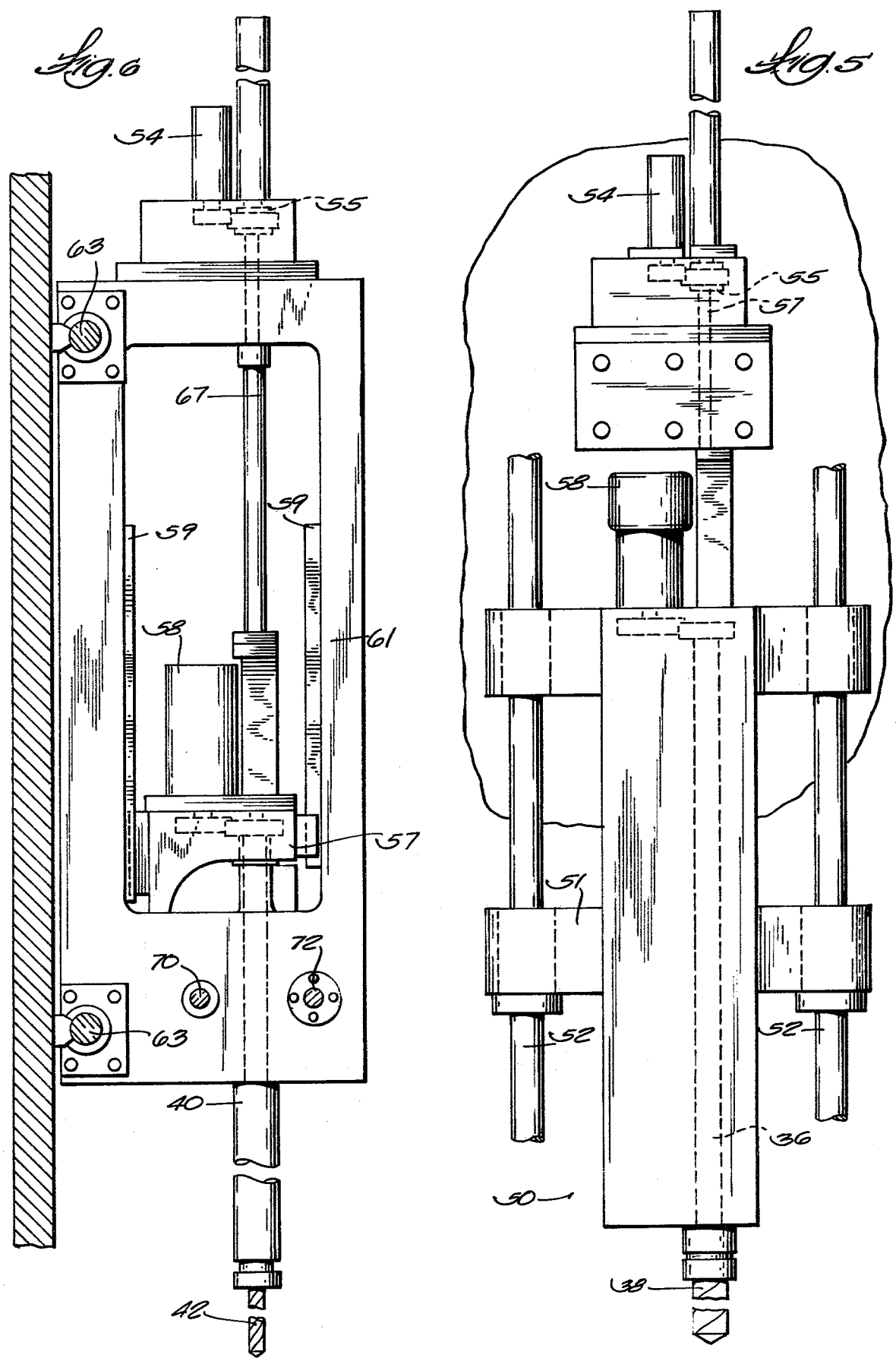

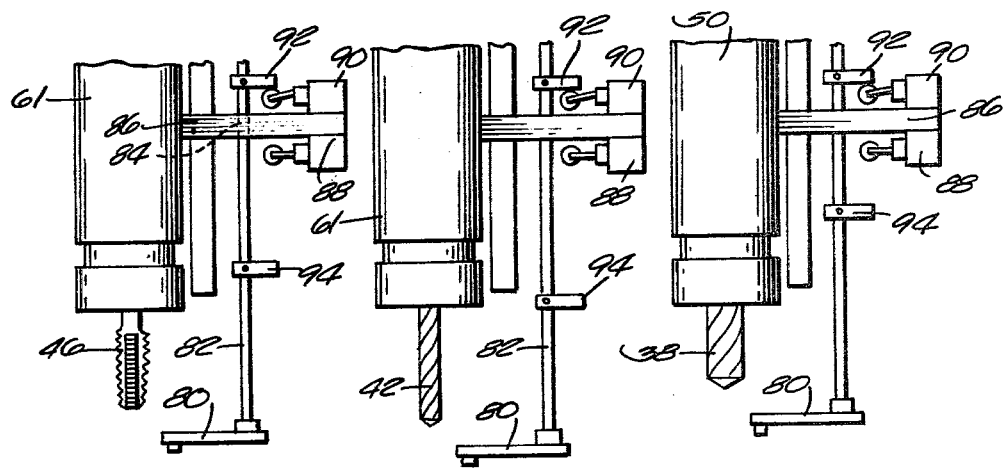
Fig. 7
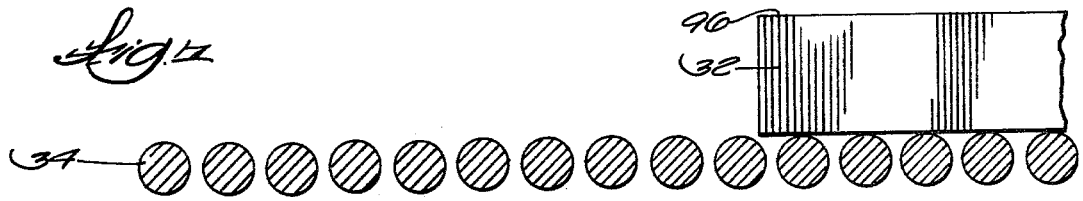
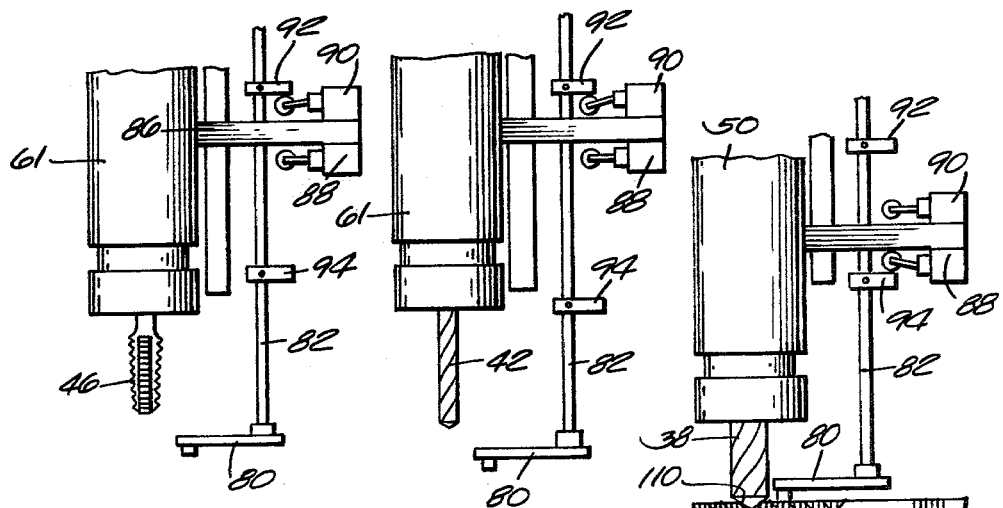
Fig. 8

DRILLING AND TAPPING MACHINING APPARATUS

BACKGROUND OF INVENTION

In existing machining apparatus in which multiple tool spindles are employed for a center drill, drill and tap for rapid machining of similar pieces, the changeover time is considerable with different size work materials and different hole spacing requirements. In addition to realigning the spindle spacing, adjustment also must be made for controlling hole depth for the different height of the work material.

SUMMARY OF INVENTION

The invention provides machining apparatus particularly adapted for center drilling, drilling and tapping of different size workpieces where the spacing of the holes to be machined on different sized workpieces is equal but varies in dimension depending on the particular workpiece. Pole pieces for electric motors commonly have equally spaced mounting holes but the pole pieces size and hole spacing varies for different horsepower motors.

More specifically, the present invention provides independent spindles for a center drill, drill and tap, each of which has its own feed and drive motor and each of which is movable vertically independently of the other. Each of the three working tools is supported on a common slide for horizontal positioning for set-up purposes with respect to the workpiece. Means are also provided for adjusting the spacing of the drill and tap spindles so that different hole spacing can be quickly provided by turning a hand crank which drives two lead screws which are geared together with gears having a 2:1 gear ratio. The gear ratio insures that the center drill and tap remain equidistant from the intermediate drill at all positions of adjustment. This readily accommodates change-over for different size electric motor pole pieces.

The mounting means and spindle drive arrangement for the spindles is arranged to provide close positioning of the work tools with a minimum of three inch centers.

The invention provides a tool feed control which operates from the surface of the workpiece, no matter what size the workpiece is, to eliminate the need for adjustments when changing over from one workpiece size to the next wherein the hole depth is the same. In this regard, each of the spindles is provided with a probe attached to a rod which is slideably mounted with respect to the spindle carrier frame and which carries switch actuator blocks which engage switches on the spindle carrier frame. Continued relative movement of the probe with respect to the tool during machining causes a second actuator block to actuate a second limit switch to stop the machining feed and withdraw the spindle and tool from the work material.

Further objects, advantages and features of the invention will become apparent from the disclosure.

DESCRIPTION OF DRAWINGS

FIG. 5 is a fragmentary enlarged view showing the center drill, sub-frame and feed and drive means.

FIG. 6 is a side view taken along line 6—6 of FIG. 2 showing the drill, drill sub-frame, feed motor and drive motor.

FIGS. 7 through 10 are sequential diagrammatic views showing the work material feed control probe for each of the center drill, drill and tapping tools operating in sequence.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
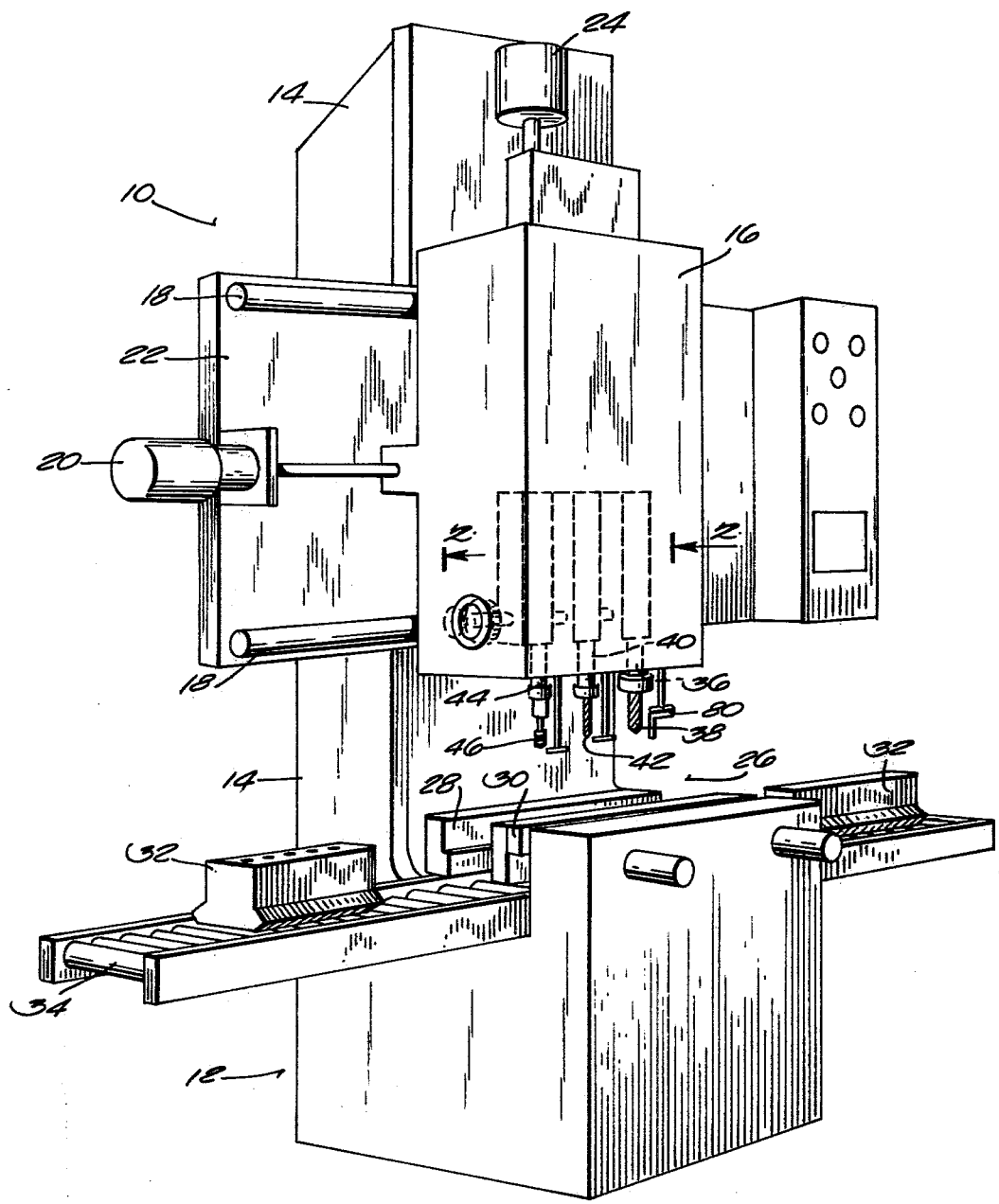
FIG. 1 is a diagrammatic perspective view of the machining apparatus of the invention.

In the drawings, FIG. 1 shows machining apparatus in accordance with the invention, which is generally designated 10, which includes a frame 12 with an upstanding column 14. A tool carriage 16 is supported on horizontal guide rods 18 for horizontal movement to align the work tool with the workpiece as subsequently described. A motor and drive apparatus 20 controls the position of the tool carriage 16 relative to the column 14. Guide rods 18 are mounted on a frame member 22 which is suitably guided and supported on column 14 for vertical positioning with respect to the column 14 by a motor 24. Thus the carriage 16 can be moved both vertically and horizontally.

At the work station 26 there are provided vise jaws or clamping members 28 and 30 appropriately controlled for clamping electric motor pole pieces 32 or other work material which is to be drilled and tapped. The pole pieces can be supported and moved to the work station 26 on a conveyor 34.

Three tool spindles are provided for multiple operations. In FIG. 1, a spindle 36 is provided for a center drill 38, a spindle 40 for a drill 42, and a spindle 44 for a tap 46. The tool spindle 36 for the center drill is supported on a slide 50 (FIG. 5) which is vertically reciprocatable along ball rods 52. Bearings 51 on the slide provide guided movement along the rods 52. The ball rods 52 provide minimal deflection of the center drill 38 and thus precise positioning of the holes. The spindle 36 is fed by a feed motor 54 which rotates a ball nut 55 which threadably engages a threaded rod 53 which is connected to the slide 50. The feed motor 54 is supported on the carriage 16. The drive motor 58 is supported on slide 50.

FIG. 6 illustrates the sub-frame 61 which supports the spindles 40 and 44 for the drill 42. A similar sub-frame 65 is provided for the tap. The sub-frames 61, 65 are guided for horizontal movement on ways 63. The quills for spindles 40 and 44 are guided for vertical movement on ways 59 by support frames 57 which also carry the spindle drive motors 58. The feed for support frames 57 is provided by feed motors 54 and nuts 55 and threaded rods 67 connected to the frames 57.

Figure 2:
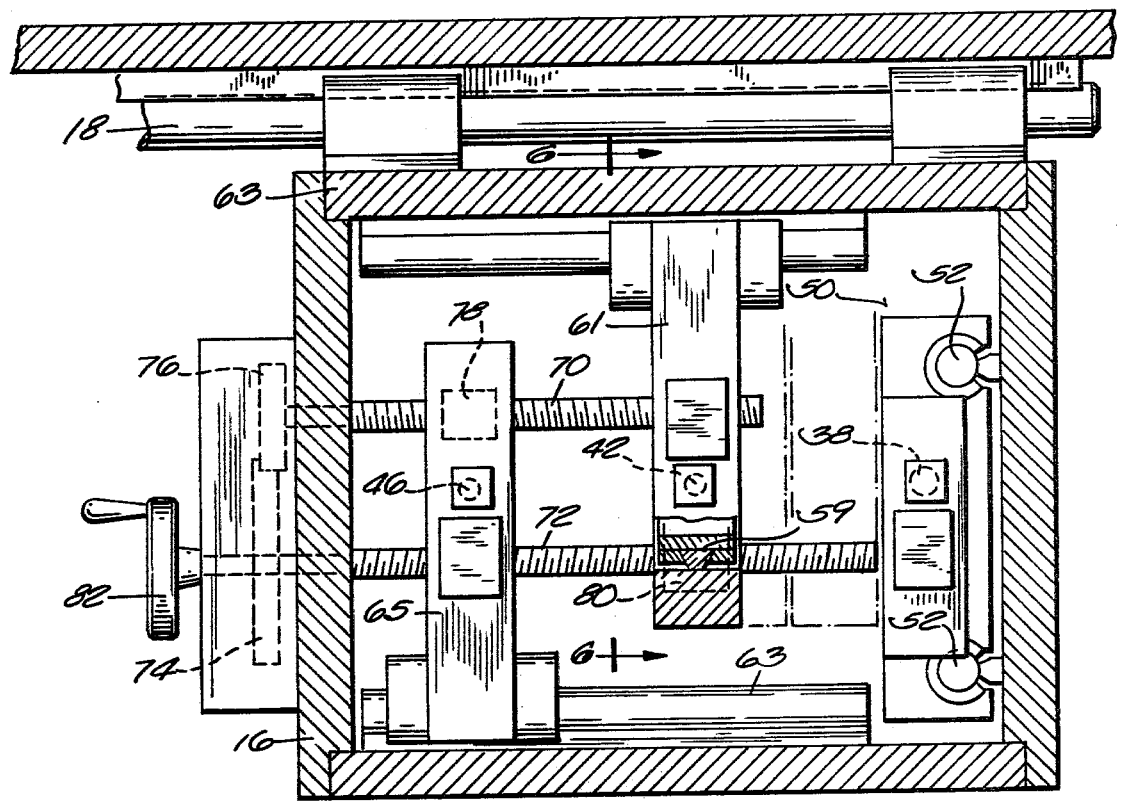
FIG. 2 is a fragmentary sectional view along line 2—2 of FIG. 1.
Figure 4:
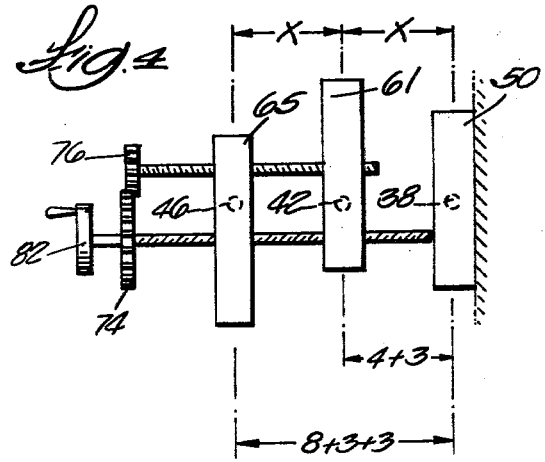
FIG. 4 is a view similar to FIG. 3 showing the tool sub-frames spaced at greater center distances.
Figure 3:
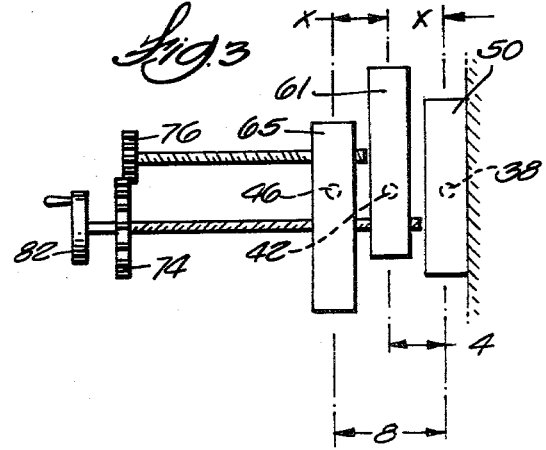
FIG. 3 is a diagrammatic plan view in reduced scale of the tool mounting sub-frames showing one position of the tools.

In accordance with the invention, means are provided for adjustably spacing the drill and tap spindles relative to each other and to the center drill to maintain the center distance of each tap and center drill equidistant from the intermediate drill and afford variable spacing for different hole spacing requirements. In the disclosed construction, the means includes lead screws 70 and 72 (FIG. 2) which are rotatably supported in the tool carriage 16. The lead screws 70 and 72 are connected by suitable gears 74 and 76 which provide a 2:1 ratio. The lead screw 70 is connected to the frame for the tap by a lead nut 78. The lead screw 72 is connected to the frame for the drill by a nut 80. The lead screw 72 is also provided with a manual crank 82. Rotation of the crank 82 will cause the tap spindle to move twice the distance the drill spindle moves from the laterally stationary center drill. This maintains the center drill and tap spindles an equal distance from the drill. For example, in FIG. 3 the spindle centers are four inches apart. If the drill spindle is moved an additional three inches from the center drill center, the tap spindle will be moved an additional three inches from the center drill for a total of ten inches from the center drill. The distance X between the tap spindle and the drill spindle and between the drill spindle and center drill spindle always remains equal.

This adjustment capability enables rapid set-up for different size electric motor pole pieces where the mounting holes for the pole pieces are equally spaced but of different spacings for different size pole pieces.

In accordance with the invention, feed control means are provided for controlling the feed rate and the depth of feed of the tools. The feed control means includes for each of the tools a probe 80 (FIGS. 1, 7) which is slideably mounted on the slide 50 or frames 61, 65. Referring to FIG. 7, the probe 80 is fixed to a slide rod 82 which can be slideably received in aperture 84 in a projecting frame portion 86. The rods 82 can be spring or gravity biased to the FIG. 7 position. The frame portion 86 can carry first and second limit switches 88 and 90 which control the rate and depth of feed as presently described. In operation of the machining apparatus, the position of the probe 80 and the limit switch actuators 92, 94 in FIG. 7 is such that limit switch 90 is in condition to provide a rapid approach feed. Once the probe 80 engages the top 96 of the work material and movement of the probe 80 relative to the frames 50, 61, 65 occurs, limit switch 90 changes condition as the switch actuator block 92 leaves the switch 90 to switch the spindle feed through suitable circuitry to a slow or appropriate feed for machining. As the center drill proceeds into the work material and reaches the required depth, the block 94 (FIG. 8) engages the switch actuator arm of the limit switch 88 to stop forward feed and reverse the feed direction to withdraw the center drill from the work material.

Figure 9:
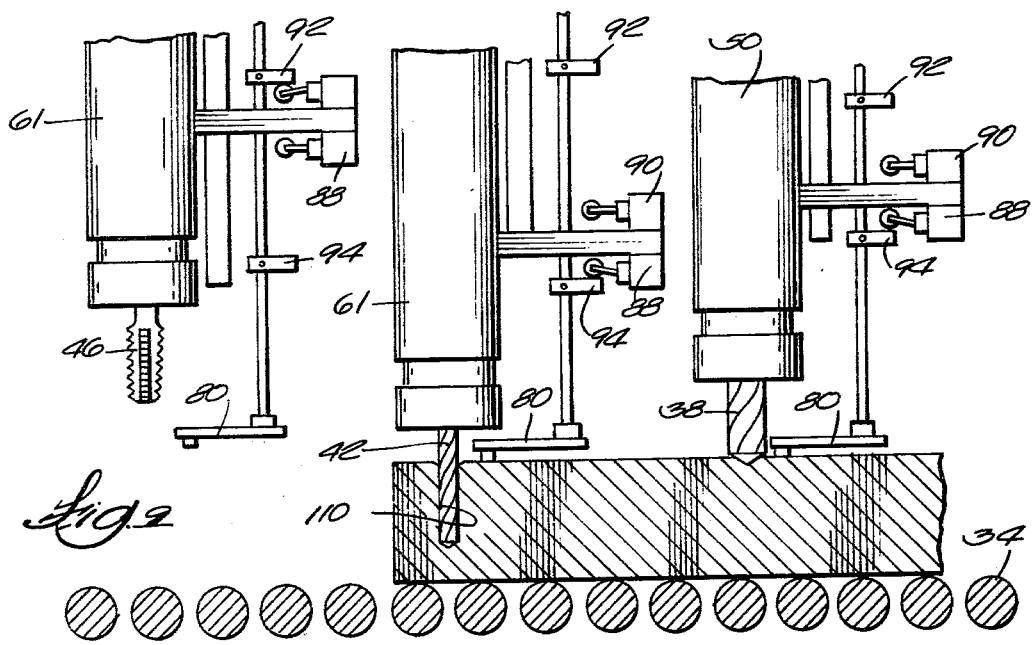
Figure 10:
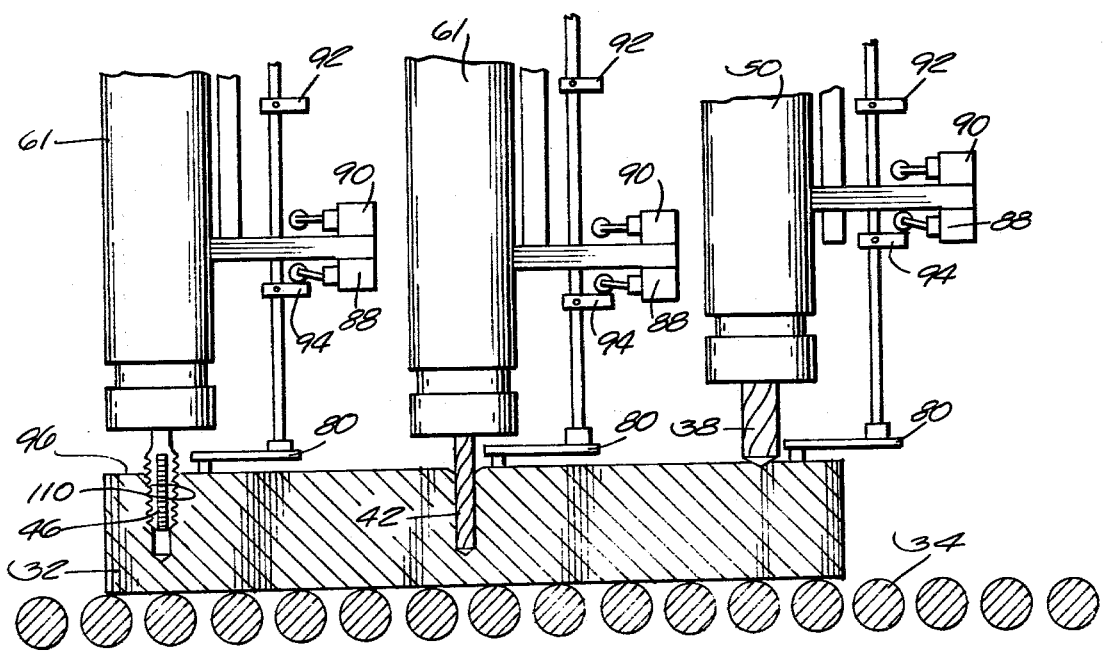

As illustrated in FIG. 9, the carriage 16 has been shifted so that the hole 110 which was center drilled in the FIG. 7 operation is being drilled by the drill 42. The center drill 38 is providing a new center drill hole in FIG. 9. In FIG. 10 all spindles are in use and hole 110 is being tapped. The actuator blocks 92 and 94 are adjustably positionable on the rods 82 to preset the desired length of approach feed and desired hole depth for each of the machining tools.

In machine set-up, the end of the work material is positioned at a reference position against a stop and the controls for the carriage are set for the required distance of the first hole from the reference position. The controls for distance of carriage travel are also adjusted. The carriage is desirably operated with a programmable controller or numeric control arrangement to expedite the machining process and provide the required uniformity for multiple and identical workpieces.

What is claimed is:

1. In multiple tool machining apparatus having a frame supporting first, second and third working tools for sequential application to a workpiece, the improvement comprising means for independently supporting each of said work tools, means for independently feeding said tools, means for rotating said tools and adjustment means for simultaneously adjustable spacing said second and third work tools relative to the first work tool to simultaneously move said third tool at twice the rate and distance moved by said second tool from said first tool so that the centers of said first and third tools are always equidistant from said second tool.

2. The improvement of claim 1 wherein said means for independently supporting each of said work tools comprises a carriage, sub-frames for each of said tools, means for supporting said sub-frames on said carriage for movement relative to the carriage at right angles with respect to the direction of tool feed and wherein said adjustment means comprises first and second lead screws supported on said carriage, nuts on said sub-frames for said second and third work tool sub-frames threadably receiving said lead screws, gear means connecting said lead screws with the gear ratio selected to cause movement of said third work tool sub-frame at twice the rate and distance moved of the second tool sub-frame.

3. The improvement of claim 2 wherein said apparatus includes a column, guide means for supporting said carriage on said column for movement at right angles with respect to the direction of tool feed, and means for moving said carriage along said guide means for adjusting the position of said tools relative to the workpiece.

* * * * *